(12) United States Patent
Zhao et al.

(10) Patent No.: US 11,796,023 B2
(45) Date of Patent: Oct. 24, 2023

(54) DAMPER WITH FIXED STRUCTURE

(71) Applicant: Zhejiang Ansant Technology Co., Ltd., Huzhou (CN)

(72) Inventors: Dong Zhao, Huzhou (CN); Gaofeng Liu, Huzhou (CN); Ziyi Yu, Huzhou (CN); Di Liu, Huzhou (CN)

(73) Assignee: Zhejiang Ansant Technology Co., Ltd., Huzhou (CN)

( * ) Notice: Subject to any disclaimer, the term of this patent is extended or adjusted under 35 U.S.C. 154(b) by 228 days.

(21) Appl. No.: 17/200,514

(22) Filed: Mar. 12, 2021

(65) Prior Publication Data

US 2021/0207676 A1 Jul. 8, 2021

Related U.S. Application Data

(63) Continuation of application No. PCT/CN2020/117115, filed on Sep. 23, 2020.

(30) Foreign Application Priority Data

Jan. 2, 2020 (CN) .......................... 202010002860.4
Jan. 2, 2020 (CN) .......................... 202020014038.5

(51) Int. Cl.
*F16F 9/44* (2006.01)
*F16F 7/09* (2006.01)

(52) U.S. Cl.
CPC ..................................... *F16F 7/09* (2013.01)

(58) Field of Classification Search
CPC ........ F16F 7/09; F16F 9/325; B60G 2204/46; B60G 2204/4605

USPC .............................. 188/300, 314, 315, 322.2
See application file for complete search history.

(56) References Cited

U.S. PATENT DOCUMENTS

| | | | | | |
|---|---|---|---|---|---|
| 1,560,477 | A | * | 11/1925 | Kessler | F16F 9/44 188/129 |
| 3,107,753 | A | * | 10/1963 | Georgette | F16F 9/446 137/533.27 |
| 4,145,073 | A | * | 3/1979 | McLuckie | B60G 17/005 280/124.16 |
| 5,161,653 | A | * | 11/1992 | Hare, Sr. | F16F 9/532 188/300 |
| 5,392,885 | A | * | 2/1995 | Patzenhauer | F16F 9/46 188/266.6 |

(Continued)

*Primary Examiner* — Thomas W Irvin
(74) *Attorney, Agent, or Firm* — Schwegman Lundberg & Woessner, P.A.

(57) ABSTRACT

A damping device with a fixing structure includes a housing and a valve stem which extends through the housing. The inner housing plate is disposed in the housing, and the inner housing plate separates a space in the housing to be a first housing chamber and a second housing chamber which are independent and communicated with each other. An end of the valve stem is in sliding and sealing fit with the first housing chamber, and the valve stem separates the first housing chamber to be two independent sub-chambers with variable volumes. A plunger rod is directly or indirectly slidably sealed on the plug hole. The powerhead assembly is configured to drive the plunger rod to move. The housing is separated to be two chambers The plunger rod is moved to communicate or block the damping liquid, which realizes two functions of damping and supporting.

8 Claims, 1 Drawing Sheet

(56) References Cited

U.S. PATENT DOCUMENTS

| | | | | | |
|---|---|---|---|---|---|
| 5,536,036 | A * | 7/1996 | Ehrlich | B60G 17/005 | 280/124.128 |
| 5,934,422 | A * | 8/1999 | Steed | F16F 9/46 | 188/299.1 |
| 5,984,062 | A * | 11/1999 | Bobrow | F16F 9/56 | 188/380 |
| 6,112,868 | A * | 9/2000 | Graham | F16F 9/48 | 188/319.2 |
| 6,129,385 | A * | 10/2000 | Blackadder | B60R 22/3413 | 280/805 |
| 6,283,259 | B1 * | 9/2001 | Nakadate | F16F 9/369 | 188/299.1 |
| 8,196,723 | B1 * | 6/2012 | Shore | F16F 9/46 | 188/316 |
| 8,240,329 | B1 * | 8/2012 | Shore | F16F 9/46 | 251/117 |
| 8,534,433 | B2 * | 9/2013 | Kramer | B60G 7/003 | 188/312 |
| 8,627,932 | B2 * | 1/2014 | Marking | F16F 9/5126 | 188/266.6 |
| 9,120,362 | B2 * | 9/2015 | Marking | F16F 9/19 | |
| 9,598,862 | B2 * | 3/2017 | Walsh | F16F 9/3292 | |
| 9,879,744 | B2 * | 1/2018 | Haller | F16F 9/46 | |
| 10,215,250 | B2 * | 2/2019 | Tanabe | F16F 9/38 | |
| 10,611,203 | B1 * | 4/2020 | Rositch | F16F 9/346 | |
| 10,981,429 | B2 * | 4/2021 | Tsiaras | F16F 9/56 | |
| 11,325,437 | B2 * | 5/2022 | Rositch | B60G 17/005 | |
| 2004/0251097 | A1 * | 12/2004 | Barbison | B60G 17/08 | 188/315 |
| 2011/0148052 | A1 * | 6/2011 | Quemere | B60G 21/073 | 280/6.15 |
| 2016/0010715 | A1 * | 1/2016 | Tanabe | F16F 9/446 | 188/297 |
| 2016/0230830 | A1 * | 8/2016 | Haller | B60G 13/00 | |
| 2019/0178329 | A1 * | 6/2019 | Dumitru | F16F 9/16 | |

* cited by examiner

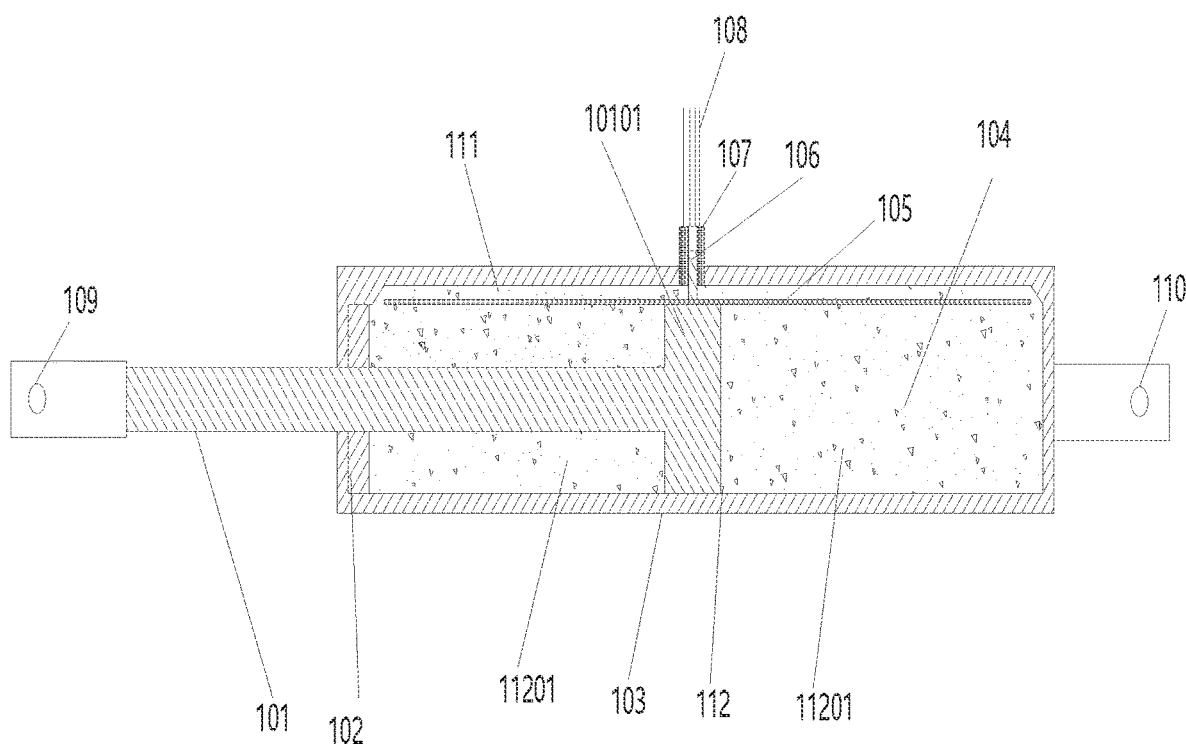

DAMPER WITH FIXED STRUCTURE

CLAIM OF PRIORITY

This application is a continuation of International Application No. PCT/CN2020/117115, filed on Sep. 23, 2020, which claims the benefit of priority to Chinese Patent Application No. 202020004038.5, filed on Jan. 2, 2020, and to Chinese Patent Application No. 202010002860.4, filed on Jan. 2, 2020, each of which is incorporated by reference herein in its entirety.

TECHNICAL FIELD

The disclosure relates to a field of damper equipment, in particular to a damping device with a fixing structure.

BACKGROUND ART

A damping rod is a commonly used damper equipment at present, but the existing damping rod can only function to damp but not to fix, because both ends of the damping rod will perform telescope movement as long as they are stressed.

The damping rod can be roughly divided into two types, a spring type and a liquid medium type. Taking the liquid medium-type damping rod as an example, such a damping rod telescopes when it is stressed because liquid medium is always in a flowable state, and in order to make this damping rod function to fix, it is necessary to make the liquid switch between being flowable and being non-flowable.

SUMMARY

In view of the above problems, the present disclosure provides a damping device with a fixing structure.

Technical schemes adopted in the disclosure are as follows:

A damping device with a fixing structure includes a housing and a valve stem which extends through the housing and is in sliding and sealing fit with the housing, and also includes an inner housing plate, a plunger rod and a powerhead assembly. The inner housing plate is disposed in the housing, and the inner housing plate separates a space m the housing to be a first housing chamber and a second housing chamber which are independent and communicated with each other. An end of the valve stem is in sliding and sealing fit with the second housing chamber, and the valve stem separates the second housing chamber to be two independent sub-chambers with variable volumes. The housing is provided with a plug hole, and the plunger rod is directly or indirectly slidably sealed at the plug hole. The powerhead assembly is disposed on an outer wall of the housing, and the powerhead assembly is configured to drive the plunger rod to move. When the plunger rod is located into the first housing chamber, the plunger rod separates the first housing chamber to be two independent compartments.

Compared with a traditional liquid medium damping rod, in this device, the inner housing plate is disposed in the housing to separate the space in the housing into the first housing chamber and the second housing chamber which are independent and communicated with each other. An end of the valve stem is in sliding and sealing fit with a chamber wall of the second housing chamber, and a convection of the damping liquid is realized between two sides of the valve stem through the first housing chamber. The plunger rod can block or communicate the first housing chamber by its own movement. When the first housing chamber is blocked, the liquid cannot convect between both sides of the valve stem, so that the valve stem cannot continue to moving. When the plunger rod moves again and communicates the first housing chamber with the second housing chamber again, the damping liquid can convect between two sides of the valve stem again, so that the valve stem can move again.

In present device, the inner housing plate is provided to separate the housing into the first housing chambers and the second housing chambers which are independent and communicated with each other. The plunger rod is moved to communicate or block the damping liquid on both sides of the valve stem, which realizes two functions of damping and supporting, and a switching between the two functions is convenient and quick.

Optionally, a valve block is provided at an end of the valve stem, and the valve block is in sliding and sealing fit with the housing and the inner housing plate.

It is well known in prior art that the valve block is a part of the valve stem.

Optionally, a sealing ring is disposed at the housing, and the sealing ring is configured for sealing a gap between the housing and the valve stem.

Optionally, the sealing ring is located in the housing.

The sealing ring is configured to prevent leakage between the valve stem and the housing.

Optionally, the valve stem is provided with a first connecting hole, and the housing is provided with a second connecting hole, and both the first connecting hole and the second connecting hole are located outside the housing.

Optionally, the powerhead assembly is sealed in the plug hole. The plunger rod is installed at the powerhead assembly, and the powerhead assembly is configured for driving the plunger rod to move.

Specifically, there are many ways to realize moving of the plunger rod on the housing. The moving of the plunger rod can be realized by electromagnetic control between the plunger rod and the powerhead assembly, or through pushing by a motor or a cylinder.

Optionally, the first housing chamber and the second housing chamber are filled with damping liquid.

Optionally, a cross section of the first housing chamber is circular, oval, square or quincunx shape. Or the cross section of the first housing chamber is a combination of circular, triangle and square shapes.

This is a method to change a damping force of the damping liquid in the housing. Other methods to change the damping force of the damping liquid can be to change roughness inside the first housing chamber or a length of the first housing chamber, all of which can change the damping force of the damping liquid in the housing.

The disclosure has beneficial effects as follows: the inner housing plate is provided to separate the housing to be the first housing chamber and the second housing chamber which are independent and communicated with each other. The plunger rod is moved to communicate or block the damping liquid on both sides of the valve stem, which realizes two functions of damping and supporting, and a switching between the two functions is convenient and quick.

BRIEF DESCRIPTION OF THE DRAWINGS

FIG. 1 is a structural schematic diagram of a damping device with a fixing structure.

Reference Numerals: 101. Valve stem, 10101. Valve Block, 102. Sealing Ring, 103. Housing, 104. Damping Liquid, 105. Inner housing plate, 106. Plunger rod, 107. Powerhead assembly, 108. Electric Wire, 109. First Connecting Hole, 110. Second Connecting Hole, 111. First housing chamber, 112. Second Housing Chamber, 11201. Sub-chambers.

DETAILED DESCRIPTION

The present disclosure will be described in detail with reference to the accompanying drawings.

As shown in FIG. 1, a damping device with a fixing structure includes a housing 103 and a valve stem 101 which extends through the housing 103 and the valve stem 101 is in sliding and sealing fit with the housing 103, and also includes an inner housing plate 105, a plunger rod 106 and a powerhead assembly 107. The inner housing plate 105 is disposed in the housing 103, and the inner housing plate 105 separates a space in the housing 103 to be a first housing chamber 111 and a second housing chamber 112 which are independent and communicated with each other. An end of the valve stem 101 is in sliding and sealing fit with the second housing chamber 112, and the valve stem 101 separates the second housing chamber 112 to be two independent sub-chambers 11201 with variable volumes. The housing 103 is provided with a plug hole, and the plunger rod 106 is directly or indirectly sealed on the plug hole. The powerhead assembly 107 is disposed on an Outer wall of the housing 103, and the powerhead assembly 107 is configured to drive the plunger rod 106 to move. When the plunger rod 106 is located in the first housing chamber 111, the plunger rod 106 separates the first housing chamber 111 to be two independent compartments. An electric wire 108 for supplying power to the powerhead assembly 107 is connected with the powerhead assembly 107.

Compared with a traditional liquid medium damping rod, in present devices, the inner housing plate 105 is disposed in the housing 103 to separate the space in the housing 103 into the first housing chamber 111 and the second housing chamber 112 which are independent and communicated with each other. An end of the valve stem 101 is in sliding and sealing fit with a chamber wall of the second housing chamber 112, and a convection of the damping liquid 104 is realized between two sides of the valve stem 101 through the first housing chamber 111. The plunger rod 106 can block or communicate the first housing chamber 111 by its own movement. When the first housing chamber 111 is blocked, the liquid cannot convect between both sides of the valve stem 101, so that the valve stem 101 cannot continue to moving. When the plunger rod 106 moves again and communicates the first housing chamber 111 with the second housing chamber 112 again, the damping liquid 104 can convect between two sides of the valve stem 101 again, so that the valve stem 101 can move again.

With reference to FIG. 1, a working process of the present device is further described. When the plunger rod 106 does not block the first housing chamber 111, there is a limit value for a right moving of the valve stem 101 (i.e., there is also a limit value for compression), because when the valve stem 101 moves to the right, the damping liquid in the right sub-chamber 11201 will flow into the left sub-chamber 11201, but the damping liquid in the housing 103 is pressed (compressed) as the valve stem 101 enters the housing 103. However, there is a limit value for the compression of the damping liquid, and thus there is a limit value for the right movement of the valve stem 101. Similarly, when the plunger rod 106 blocks the first housing chamber 111 and the valve stem 101 moves to the right again, the damping liquid in the right sub-chamber 11201 cannot flow, but will be partially compressed. At this time, the valve stem 101 will move to the right for some distance but cannot continue to move to the right. Similarly, when the valve stem 101 moves to the left, it cannot move further to the left because of negative pressure in the left sub-chamber 11201.

In present device, the inner housing plate 105 is provided to separate the housing 103 to be the first housing chambers 111 and the second housing chambers 112 which are independent and communicated with each other. The plunger rod 106 is moved to communicate or block the damping liquid 104 on both sides of the valve stem 101, which realizes two functions of damping and supporting, and a switching between the two functions is convenient and quick.

As shown in FIG. 1, a valve block 10101 is provided at an end of the valve stem 101, and the valve block 10101 is in sliding and sealing fit with the housing 103 and the inner housing plate 105.

It is well known in prior art that the valve block 10101 is a part of the valve stem 101.

As shown in FIG. 1, the housing 103 is provided with a sealing ring 102 for sealing a gap between the housing 103 and the valve stem 101.

As shown in FIG. 1, the sealing ring 102 is located inside the housing 103. The sealing ring 102 is configured to prevent leakage between the valve stem 101 and the housing 103.

As shown in FIG. 1, the valve stem 101 is provided with a first connecting hole 109, and the housing 103 is provided with a second connecting hole 110. The first connecting hole 109 and the second connecting hole 110 are located outside the housing 103.

As shown in FIG. 1, the powerhead assembly 107 is sealed in the plug hole, the plunger rod 106 is installed on the powerhead assembly 107, and the powerhead assembly 107 is configured to drive the plunger rod 106 to move.

Specifically, there are many ways to realize moving of the plunger rod 106 on the housing 103. The moving of the plunger rod 106 can be realized by electromagnetic control between the plunger rod 106 and the powerhead assembly 107, or through pushing by a motor or a cylinder.

As shown in FIG. 1, the first housing chamber 111 and the second housing chamber 112 are filled with damping liquid 104.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

We claim:

1. A damping device with a fixing structure, comprising a housing and a valve stem, wherein the valve stem extends through the housing and the valve stem is in sliding and sealing fit with the housing, wherein the damping device with the fixing structure further comprises an inner housing plate, a plunger rod, and a powerhead assembly, wherein the inner housing plate is disposed in the housing, and the inner housing plate separates a space in the housing to be a first housing chamber and a second housing chamber which are independent and communicated with each other, the first housing chamber and the second housing chamber are respectively communicated at two ends of the inner housing plate, and the first housing chamber and the second housing chamber are filled with damping liquid, an end of the valve stem is in sliding and sealing fit with the second housing chamber and the inner housing plate respectively, and the valve stem separates the second housing chamber to be two independent sub-chambers with variable volumes;

wherein the housing is provided with a plug hole, and the plunger rod is directly or indirectly slidably sealed at the plug hole, wherein the powerhead assembly is disposed on an outer wall of the housing, the powerhead assembly is configured to drive the plunger rod to move to block or communicate the first housing chamber to communicate or block the damping liquid on both sides of the valve stem, so as to control a movement or non-movement of the valve stem; and when the plunger rod extends into the first housing chamber and blocks the first housing chamber, the plunger rod separates the first housing chamber to be two independent compartments.

2. The damping device with the fixing structure according to claim 1, wherein a valve block is provided at the end of the valve stem, and the valve block is in sliding and sealing fit with the housing and the inner housing plate respectively.

3. The damping device with the fixing structure according to claim 1, wherein a sealing ring is disposed at the housing, and the sealing ring is configured for sealing a gap between the housing and the valve stem.

4. The damping device with the fixing structure according to claim 3, wherein the sealing ring is located in the housing.

5. The damping device with the fixing structure according to claim 1, wherein the valve stem is provided with a first connecting bole, and the housing is provided with a second connecting hole, and both the first connecting hole and the second connecting hole are located outside the housing.

6. The damping device with the fixing structure according to claim 1, wherein the powerhead assembly is sealed in the plug hole, the plunger rod is installed at the powerhead assembly, and the powerhead assembly is configured for driving the plunger rod to move.

7. The damping device with fixing structure according to claim 1, wherein a cross section of the first housing chamber is circular, oval, square, or quincunx shape, or the cross section of the first housing chamber is a combination of circular, triangle, and square shapes.

8. The damping device with the fixing structure according to claim 1, wherein chamfers are provided inside the housing and the chamfers correspond to the two ends of the inner housing plate.

* * * * *